3,616,602
LOW-TEMPERATURE PURIFICATION OF FLUIDS
George E. Hays and Melvin A. Albright, Bartlesville, Okla., assignors to Phillips Petroleum Company
No Drawing. Filed Jan. 29, 1970, Ser. No. 6,970
Int. Cl. B01d 53/02
U.S. Cl. 55—66                                                              10 Claims

ABSTRACT OF THE DISCLOSURE

An adsorption method of purifying liquid or gas streams which employs a temperature at or below the freezing point of the constituents to be adsorptively removed from the stream. Operating at or below such temperature greatly increases the adsorption capacity of the adsorptive material.

This invention relates to the purification of fluids. In another aspect, it relates to a method to increase the adsorptive capacity of an adsorptive material.

Increasingly required for modern industrial purposes are high-purity fluids, particularly gases. For example, helium recovered from helium-containing natural gas sources formerly was obtained at a purity of only about 98 percent. Conventional methods of purification included a caustic or ethanolamine extraction for removal of carbon dioxide, followed by cooling to about $-185°$ C. at suitable elevated pressure for separation of nitrogen, and succeeded by further cooling and separation to obtain the 98 percent pure helium product.

However, such purities are insufficient for many modern applications. Consequently, persistent efforts have been made to improve the remaining components. One approach, for example, has been to use charcoal or activated carbon or other adsorptive material in an adsorption contacting process. This approach has had serious limitations due to the exceedingly low adsorptive capacities of the adsorptive materials. The method consequently has necessitated large and expensive adsorptive installations, expensive due to size and further expensive to operate so as to maintain large quantities of material at the suitably low temperatures employed for many purification applications.

Our invention solves the problems and represent a real breakthrough in adsorptive applications. Our invention increases tremendously the adsorptive capacity of adsorptive materials—not just by unit number increases—but by factors of increase such as 10 over what has been obtainable heretofore. Furthermore, our process enables the production of very high purity product streams.

We have discovered that tremendous increases in adsorptive capacities are attainable when the stream to be purified is reduced to a temperature at or below the freezing point of the constituent or constituents to be removed from the stream.

At this point and below, the adsorptive capacities of adsorptive materials are very much greater than are obtainable at even slightly higher temperatures, so that adsorptive removal of trace components for the first time has become a practical and economical method. Large amounts of gas or liquid can now be purified by contact with relatively small amounts of adsorptive material. The problems of cooling are proportionately reduced.

Furthermore, with concentration of the adsorbed components very much greatly increased, relative to a given amount of adsorptive material, we can now better recover these components on desorption, since may of these components often are valuable and recovery is desired, such as the rare gases.

It is an object, therefore, of our invention to provide improved methods for the purification of gases and liquids. It is a further object to produce fluids of higher purity. An additional object is to increase the adsorptive capacities of adsorptive materials. Also, it is our object to provide an improved separation process.

Our invention resides in our discovery that the capacity of an adsorptive material to extract trace contaminates or constituents from fluid streams is manyfold increased by lowering the contacting temperature of the stream to or below the freezing point of the constituents to be adsorptively removed. Above such temperatures, the adsorption capacity of the adsorbent for the components to be removed is exceedingly low. But, by operating the adsorption contacting process at least at the freezing point of such components, very high adsorptive capacities are attained.

Our process has a wide application, to many liquid and gas streams. For example, removable from a helium gas stream are such components as hydrogen, methane and heavier hydrocarbons, carbon monoxide, carbon dioxide, nitrogen, oxygen, neon, argon, krypton, xenon.

Removable from a methane stream are hydrogen sulfide, sulfur dioxide, carbon dioxide, moisture, and other minor amount constituents often part of a methane stream.

Our process also is applicable to the purification of air by the removal of acetylenes, hydrocarbons, moisture, carbon dioxide, and other components present in minor amounts including the rare gases.

This invention is further applicable to the purification and/or separation of many liquid streams. For example, a mixture of xylenes containing p-xylene, o-xylene, m-xylene, and ethylbenzene can be passed through a tower containing an adsorbent selective for the para isomer. By operating the adsorber at a temperature, for example, of about 40° F., thus below the freezing point of the para-xylene which is from $+55$ to $+87°$ F., the capacity of the adsorbent such as a molecular sieve is greatly increased. This avoids the former necessity to refrigerate to reach very low temperatures in order to crystallize out the para isomer.

Water may similarly be removed from alcohols by using adsorbents such as molecular sieves at temperatures below 32° F., i.e., below the freezing point of the water, thus eliminating expensive steps of fractional distillation and chemical dehydration.

Our invention will be particularly described in terms of its application to a purification process of helium. In trying to achieve a high purity helium, removal of neon, for example, has been an extremely troublesome problem. More particularly, neon is not removable on a practical basis by charcoal adsorption at even liquid nitrogen temperatures of $-320$ to $-330°$ F. Even at $-400°$ F., neon can only be removed from helium by using relatively large quantities of adsorptive material. However, at temperatures below the neon freezing point of about $-416°$ F., neon is readily and efficiently removable by adsorption. However, our invention, as we have indicated, has much broader application, therefore the particular example should not be limitative of our process and invention.

EXAMPLE I

Helium gas which had been pre-purified in a charcoal column at $-320°$ F. was passed through a 20 to 60 mesh charcoal bed. The length of the adsorption bed was sized to obtain breakthrough in about an 8 to 16 hour interval. The columns used were 0.25 inch O.D. by 0.5 foot to 2 feet in length. The volume of gas passed through the bed was measured from the displacement of a gas meter, and the composition was monitored by periodic analyses at 10 minute intervals by gas chromatography.

The analytical procedure used was sensitive to low p.p.m. concentrations of neon, oxygen, argon, and nitrogen. A concentration of 1 p.p.m. of neon produced a displacement on the recorder chart used of about 1 inch. The lower limit of detection was about 0.1 p.p.m. The method of analysis used involved the accumulation of neon from a 200 to 400 cc. sample of gas onto a chromatographic column. The accumulated neon was then transferred to a second chromatographic column to additionally sharpen the peak. This procedure was used with the chromatograph carrier gas as the sample gas; the result was an analysis for neon, oxygen, argon, and nitrogen in the carrier gas; and no separate sampling was necessary. The procedure reproduced well with a scatter of only about ±2 percent at 20 p.p.m. neon level in a helium stream. Low p.p.m. standards were not necessary for calibration of the chromatograph since reference samples of less volume and higher concentration were injected to obtain a sensitivity factor. Absolute accuracy was about ±10 percent.

Table I shows data obtained from adsorption runs with the conditions and capacities of adsorption bed as shown. The capacities are given in grams of neon per gram of charcoal at breakthrough. By breakthrough is meant the point at which neon was detectable in the effluent from the adsorber. Prior to breakthrough, there was no detectable neon in the purified product.

There are two basic ways to measure capacity of an adsorptive material: at breakthrough, and at saturation, i.e., when the effluent has the same composition as the inlet feed. We used breakthrough in our runs, since this would be the commercially desirable approach. The capacity at breakthrough was determined from the volume of gas that had passed through the adsorption bed from the start of the run until the first neon was detected by analysis of the adsorption bed outlet gas.

Table II records analyses for neon in the helium feed gas stream at the beginning and end of each run, and outlines volumes of test gas and flow rates for each run. The helium feed stream contained about 28 p.p.m. neon for the runs in general.

TABLE I.—NEON ADSORPTION DATA

| Run | Temperature, °F. | Pressure, p.s.i.a. | Adsorption bed Height [1] | Charcoal, grams | Bed capacity, grams neon/ gram charcoal— breakthrough |
|---|---|---|---|---|---|
| 1 | −390 | 150 | x | | 0.014 |
| 2 | −400 | 44 | x | | 0.042 |
| 3 | −400 | 60 | x | | 0.059 |
| 4 | −400 | 90 | x | | 0.084 |
| 5 | −400 | 120 | x | | 0.063 |
| 6 | −400 | 150 | x | | 0.055 |
| 7 | −400 | 150 | x | | 0.053 |
| 8 | −400 | 150 | 2x | | 0.067 |
| 9 | −400 | 150 | x/2 | | 0.051 |
| 10 | −420 | 150 | x | | 0.330 |
| 11 | −440 | 150 | x/2 | | [2] 0.598 |

[1] x=1 foot.
[2] Breakthrough did not occur.

TABLE II.—NEON ADSORPTION DATA

| Run | Analysis for neon, inlet Gas | | Helium test gas volumes and flow rates, test gas at breakthrough | | |
|---|---|---|---|---|---|
| | Start | End | Volume, ft.³ | Time, hours | Flow, ft.³/hr. |
| 1 | 28 | 28 | 65.6 | 2¾ | 24.7 |
| 2 | | 28 | 193 | 7 | 27.6 |
| 3 | 24 | 24 | 270 | 5½ | 48.2 |
| 4 | 28 | | 384 | 12¾ | 30.1 |
| 5 | 28 | 29 | 287 | 5½ | 52.7 |
| 6 | 28 | 35 | 251 | 7¾ | 32.3 |
| 7 | | 28 | 241 | 6 | 40.2 |
| 8 | 28 | 28 | 511 | 16 | 31.9 |
| 9 | 27 | 27 | 90 | 2 | 45.0 |
| 10 | 28 | 29 | 1,502 | 30½ | 49.2 |
| 11 | 28 | 27 | 1,064 | 17¼ | 61.7 |

The bed capacities in grams of neon per grams of charcoal at breakthrough clearly reflects the tremendous increase in adsorptive capacity of the charcoal adsorbent once the temperature of operation had been reduced to the freezing point of neon, about −416° F. At a −400° F. contacting temperature, the bed capacity was only about 0.05 to 0.06 grams of neon per gram of charcoal; at −390° F. capacity had dropped to only about 0.01. However, once the freezing point line was crossed, the capacity increased remarkably, reaching 0.33 at −420° F., and greater than 0.6 at −440° F. It was apparent that the adsorptive capacity of the charcoal at −440° F. was even higher than obtained on the test since breakthrough did not occur.

Furthermore, the effluent helium stream was so pure, so free of the neon constituent, that the neon content was not detectable, and thus was less than at least 0.1 p.p.m. according to analysis conditions. Thus an exceedingly high purity product is attainable by our process.

The data clearly reflects the high adsorptive capacity of the adsorptive material when operating at a temperature at or below the freezing point of the constituent to be removed from the fluid stream.

Other gas or liquid streams can be similarly treated for removal of various constituents. It will be apparent to one skilled in the art that our invention has many applications, including the preferential selective adsorption of certain components from a feed stream by carefully selecting a contacting temperature just below the freezing point of one component but above the freezing point of another component or components. The following list of freezing points will suggest many applications of our invention, and are not to be considered limitative thereof.

TABLE III

| | Freezing point [1] | |
|---|---|---|
| Component | °F. | °C. |
| Carbon dioxide | −69.9 | −56.6 |
| Sulfur dioxide | −98.9 | −72.7 |
| Ammonia | −107.9 | −77.7 |
| Acetylene | −115.2 | −81.8 |
| Hydrogen sulfide | −121.9 | −85.5 |
| Xenon | −169.4 | −111.9 |
| Krypton | −249.9 | −156.6 |
| Ethylene | −272.5 | −169.2 |
| Methane | −296.5 | −182.5 |
| Ethane | −297.0 | −182.8 |
| Propane | −309.8 | −189.9 |
| Carbon monoxide | −326.2 | −199.0 |
| Nitrogen | −345.8 | −209.8 |
| Oxygen | −361.1 | −218.4 |
| Neon | −415.6 | −248.7 |
| Hydrogen | −434.4 | −259.1 |
| Helium | −458.0 | −272.2 |
| Absolute zero | −459.67 | −273.15 |

[1] From Handbook of Chemistry and Physics, 49th edition, The Chemical Rubber Co., Cleveland, Ohio (1968).

The actual methods of maintaining suitable temperature for contacting of the adsorbent, such as refrigeration processes where low temperatures are a necessity, and methods of contacting the adsorptive material employed, are all well known in the art and hence detailed descriptions herein are not necessary. For example, a discussion of one method of contacting various adsorbents is contained in United States Letters Patent 3,445,990 to G. E. Hays and F. L. Poska.

The adsorption material employed in utilization of our invention is one which has an affinity for the component to be removed from the feed mixture, and therefore the selection of an adsorbent is determined by the characteristics of the component to be removed and the characteristics of the other components in the mixture. If desired, the adsorption zone can be packed with a number of different adsorptive materials arranged in layers. Adsorbents available and useful in our invention include carbon and its derivatives such as activated carbon, charcoal, bone char, and the like, as well as other adsorbents including alumina, silica gel, and molecular sieves or zeolites.

In practice of our invention, an impurities-containing stream, such as a gas stream, is conducted at a predetermined pressure and temperature through a feed conduit in and through a contacting chamber or vessel containing a suitable amount of adsorptive material in a regenerated condition. Flow is continued until monitoring or detection equipment determines breakthrough. Or, of course, a run can be ended at any time prior thereto. The adsorbent material is then regenerated by ceasing flow of the impurities-containing stream, and heating the adsorbent material to a slightly elevated temperature and passing an inert gas through the bed in order to release a large proportion of the adsorbed impurities. Other methods of desorption can be practiced, if desired. In removing neon from helium, for example, some of the purified helium can be used to strip neon from the bed to avoid introducing another material.

Because of the exceedingly high capacity available to adsorbents, such as charcoal, as demonstrated by the examples of our disclosure, it is feasible to quickly and easily recover the adsorbed components which then can be separately conducted to further purification by known means. The regenerated adsorbent can then be returned to service.

Reasonable variations and modifications of our invention are possible within the scope of this disclosure, yet without departing from the scope and spirit thereof.

We claim:

1. A method to increase substantially the adsorptive capacity of an adsorptive material wherein the improvement comprises contacting a fluid stream containing at least one component to be adsorptively removed with said adsorptive material at a contacting temperature at least below the freezing point of said at least one component, and thereby substantially increasing the adsorptive capacity of said adsorptive material for said component.

2. An improved separation process comprising:
   (a) adjusting the temperature of a mixed fluid feed to a temperature whereby the adsorptive capacity of an adsorbent toward at least one component of said mixed fluid feed is substantially increased, said temperature being at least below the freezing point of said component,
   (b) contacting said adsorbent with said fluid feed at said adjusted temperature and thereby substantially adsorbing at least one component from said mixed fluid feed, leaving a purified fluid.

3. A process according to claim 2 further comprising the steps:
   (c) desorbing said adsorbed component,
   (d) recovering said desorbed component,
   (e) repeating said steps (a) through (d).

4. A process according to claim 2 wherein said stream contains at least two said components, said temperature is at least below the freezing point of a first said component and above the freezing points of other said components and thereby increasing substantially the adsorptive capacity and the selectivity of said adsorptive material toward said first component.

5. A method according to claim 4 wherein said adsorptive material is selected from activated carbon, charcoal, bone char, alumina, silica gel, and molecular sieves.

6. A method according to claim 5 wherein said fluid stream to be purified is a methane stream.

7. A method according to claim 5 wherein said fluid stream to be purified is an air stream.

8. A method according to claim 5 wherein said fluid stream to be purified is a liquid stream and is a mixture of xylenes.

9. A method according to claim 5 wherein said first gas stream is a helium gas stream, and said component is a rare gas.

10. A method according to claim 9 wherein said rare gas is neon, and said contacting temperature is at least below $-415.6°$ F.

References Cited
UNITED STATES PATENTS

| | | | |
|---|---|---|---|
| 2,968,160 | 1/1961 | Schilling et al. | 62—18 X |
| 3,517,521 | 6/1970 | Emerson | 55—66 X |

REUBEN FRIEDMAN, Primary Examiner

R. W. BURKS, Assistant Examiner

U.S. Cl. X.R.

55—74; 62—18; 210—32

UNITED STATES PATENT OFFICE
CERTIFICATE OF CORRECTION

Patent No. 3,616,602　　　　　Dated　November 2, 1971

Inventor(s)　George E. Hays et al.

It is certified that error appears in the above-identified patent and that said Letters Patent are hereby corrected as shown below:

Claim 9, Column 6, line 23, cancel "said"; line 24, after "said" and before "component" insert -- first --.

Signed and sealed this 13th day of June 1972.

(SEAL)
Attest:

EDWARD M. FLETCHER, JR.　　　　　ROBERT GOTTSCHALK
Attesting Officer　　　　　　　　Commissioner of Patents

UNITED STATES PATENT OFFICE
CERTIFICATE OF CORRECTION

Patent No. 3,616,602                    Dated  November 2, 1971

Inventor(s) George E. Hays et al.

It is certified that error appears in the above-identified patent and that said Letters Patent are hereby corrected as shown below:

Column 6, line 23, cancel "first"; line 24, after "said" and before "component" insert -- first --.

This certificate supersedes Certificate of Correction issued June 13, 1972.

Signed and sealed this 29th day of August 1972.

(SEAL)
Attest:

EDWARD M. FLETCHER, JR.
Attesting Officer

ROBERT GOTTSCHALK
Commissioner of Patents